United States Patent
Du et al.

(10) Patent No.: US 9,973,672 B2
(45) Date of Patent: May 15, 2018

(54) PHOTOGRAPHING FOR DUAL-LENS DEVICE USING PHOTOGRAPHING ENVIRONMENT DETERMINED USING DEPTH ESTIMATION

(71) Applicant: HUAWEI DEVICE (DONGGUAN) CO., LTD., Dongguan (CN)

(72) Inventors: Cheng Du, Beijing (CN); Bin Deng, Shenzhen (CN); Wei Luo, Shanghai (CN)

(73) Assignee: HUAWEI DEVICE (DONGGUAN) CO., LTD., Dongguan (CN)

(*) Notice: Subject to any disclaimer, the term of this patent is extended or adjusted under 35 U.S.C. 154(b) by 0 days. days.

(21) Appl. No.: 15/102,203

(22) PCT Filed: Dec. 6, 2013

(86) PCT No.: PCT/CN2013/088755
§ 371 (c)(1),
(2) Date: Jun. 6, 2016

(87) PCT Pub. No.: WO2015/081555
PCT Pub. Date: Jun. 11, 2015

(65) Prior Publication Data
US 2016/0301840 A1    Oct. 13, 2016

(51) Int. Cl.
*H04N 5/225*        (2006.01)
*G03B 15/00*       (2006.01)
(Continued)

(52) U.S. Cl.
CPC ........... *H04N 5/2258* (2013.01); *G03B 15/00* (2013.01); *G03B 17/00* (2013.01); *H04N 5/217* (2013.01);
(Continued)

(58) Field of Classification Search
CPC .. H04N 5/2258; H04N 5/265; H04N 13/0239; H04N 5/2355; H04N 5/23229;
(Continued)

(56) References Cited

U.S. PATENT DOCUMENTS

| 6,101,333 A | 8/2000 | Bullitt et al. |
| 8,244,402 B2 | 8/2012 | Wells et al. |

(Continued)

FOREIGN PATENT DOCUMENTS

| CN | 101489115 A | 7/2009 |
| CN | 101632296 A | 1/2010 |

(Continued)

OTHER PUBLICATIONS

Foreign Communication From a Counterpart Application, European Application No. 13898769.8, Extended European Search Report dated Aug. 19, 2016, 12 pages.

(Continued)

*Primary Examiner* — Lin Ye
*Assistant Examiner* — Chan T Nguyen
(74) *Attorney, Agent, or Firm* — Conley Rose, P.C.

(57) ABSTRACT

A photographing method for a dual-lens device may include acquiring a first image collected at a first moment by a first image sensor and a second image collected at the first moment by a second image sensor; performing scene recognition on the first image and/or the second image, and performing depth estimation on the first image and the second image to determine a photographing environment; and when an instruction for a photographing operation is received, generating a picture using the multi-frame algorithm. When photographing is performed using a multi-frame algorithm, two frames of images can be collected at the same time using a dual-lens device, which can reduce impact caused by a jitter of the device or a motion of a target (Continued)

object, so that ghost detection and an elimination algorithm are not required, thereby reducing a photographing time.

20 Claims, 3 Drawing Sheets (51) Int. Cl.
G03B 17/00 (2006.01)
H04N 5/217 (2011.01)
H04N 5/232 (2006.01)
H04N 5/235 (2006.01)
H04N 13/02 (2006.01)
H04N 5/265 (2006.01)
H04N 13/00 (2018.01)

(52) U.S. Cl.
CPC ....... H04N 5/2355 (2013.01); H04N 5/23229 (2013.01); H04N 5/23238 (2013.01); H04N 5/265 (2013.01); H04N 13/0239 (2013.01); H04N 2013/0081 (2013.01)

(58) Field of Classification Search
CPC .............. H04N 5/217; H04N 5/23238; H04N 2013/0081; G03B 17/00; G03B 15/00
USPC ........................................................ 348/239
See application file for complete search history.

(56) References Cited

U.S. PATENT DOCUMENTS

| 8,401,380 | B2 | 3/2013 | Pace et al. |
| 2008/0218612 | A1 | 9/2008 | Border et al. |
| 2008/0219654 | A1 | 9/2008 | Border et al. |
| 2009/0245688 | A1 | 10/2009 | Robinson et al. |
| 2010/0149367 | A1* | 6/2010 | Yim ...................... H04N 5/2621 348/222.1 |
| 2010/0277619 | A1 | 11/2010 | Scarff |
| 2010/0317408 | A1 | 12/2010 | Ferren et al. |
| 2011/0026840 | A1* | 2/2011 | Tao ..................... G06K 9/00684 382/224 |
| 2011/0249086 | A1 | 10/2011 | Guo et al. |
| 2012/0069141 | A1 | 3/2012 | Sim et al. |
| 2012/0074227 | A1* | 3/2012 | Ferren ................ G02B 13/0065 235/462.21 |
| 2013/0021447 | A1 | 1/2013 | Brisedoux et al. |
| 2013/0021484 | A1 | 1/2013 | Sorek et al. |
| 2013/0135445 | A1 | 5/2013 | Dahi et al. |
| 2015/0312455 | A1* | 10/2015 | Venkataraman .. H01L 27/14618 348/340 |
| 2016/0148416 | A1 | 5/2016 | Wu et al. |

FOREIGN PATENT DOCUMENTS

| CN | 101637019 A | 1/2010 |
| CN | 101902572 A | 12/2010 |
| CN | 101958976 A | 1/2011 |
| CN | 102422219 A | 4/2012 |
| CN | 102892008 A | 1/2013 |
| EP | 2306367 A1 | 4/2011 |
| EP | 2640060 A1 | 9/2013 |
| JP | 2009239908 A | 10/2009 |
| KR | 20120006066 A | 1/2012 |
| KR | 20130011951 A | 1/2013 |

OTHER PUBLICATIONS

Foreign Communication From a Counterpart Application, PCT Application No. PCT/CN2013/088755, English Translation of International Search Report dated Sep. 24, 2014, 2 pages.
Foreign Communication From a Counterpart Application, PCT Application No. PCT/CN2013/088755, English Translation of Written Opinion dated Sep. 24, 2014, 5 pages.
Foreign Communication From a Counterpart Application, Chinese Application No. 201380077779.0, Chinese Search Report dated Aug. 11, 2017, 2 pages.
Foreign Communication From a Counterpart Application, Chinese Application No. 201380077779.0, Chinese Office Action dated Aug. 17, 2017, 3 pages.
Foreign Communication From a Counterpart Application, Korean Application No. 10-2016-7016965, Korean Office Action dated Aug. 11, 2017, 7 pages.
Foreign Communication From a Counterpart Application, Korean Application No. 10-2016-7016965, English Translation of Korean Office Action dated Aug. 11, 2017, 7 pages.

* cited by examiner

PHOTOGRAPHING FOR DUAL-LENS DEVICE USING PHOTOGRAPHING ENVIRONMENT DETERMINED USING DEPTH ESTIMATION

CROSS-REFERENCE TO RELATED APPLICATIONS

This application is a National Stage of International Application No. PCT/CN2013/088755, filed on Dec. 6, 2013, which is hereby incorporated by reference in its entirety.

TECHNICAL FIELD

Embodiments of the present disclosure relate to the image processing field, and more specifically, to a photographing method for a dual-lens device and a dual-lens device.

BACKGROUND

With popularization of smart devices, more and more devices are equipped with a camera function. Generally, a rear surface of a device is equipped with a single-lens camera, or a front surface of a device is also equipped with another single-lens camera.

A common camera function includes an image preview function, that is, an image currently acquired by a lens is dynamically displayed on a built-in display or an external display of a device. For example, when a user is quite satisfied with a currently previewed image, the user may press a specific button, such as a hardware button equipped on the device or a button simulated by a photographing application, so as to give the device an instruction for a photographing operation. When receiving the instruction for the photographing operation, the device processes the currently previewed image to generate a photograph.

A multi-frame technology is a technical trend in a present photographing field. Multiple frames of images are obtained by means of multi-frame photographing, and the obtained multiple frames of images are synthesized using a synthesis algorithm, which can effectively improve photographing quality. A multi-frame technology of a single-lens camera has already been widely used in existing devices such as a camera and a mobile terminal. However, the single-lens camera can only collect multiple frames of images at different times, and in a process of collecting multiple frames of images, there is a jitter of the single-lens camera or a motion of a target object; therefore, when a synthesis algorithm is being performed on the multiple frames of images, in a case of a non-night scene, ghost detection needs to be performed and/or a compensation algorithm needs to be used to eliminate impact on the images caused by the jitter of the single-lens camera or the motion of the target object.

SUMMARY

Embodiments of the present disclosure provide a photographing method for a dual-lens device and a dual-lens device, which can, in a case of a non-night scene, reduce impact on an image caused by a jitter of a camera or a motion of a target object.

According to a first aspect, a photographing method for a dual-lens device is provided, where the dual-lens device includes a first lens and a second lens that are disposed on a same plane of the dual-lens device, and the photographing method includes acquiring a first image collected at a first moment by a first image sensor corresponding to the first lens and a second image collected at the first moment by a second image sensor corresponding to the second lens; performing scene recognition on the first image and/or the second image, and performing depth estimation on the first image and the second image to determine a photographing environment, where the photographing environment includes at least one of a scene with a wide depth of field, a distant scene with a high dynamic range (HDR), and a distant scene with rich details; determining a multi-frame algorithm according to the photographing environment; and when an instruction for a photographing operation is received, synthesizing a third image and a fourth image using the multi-frame algorithm to generate a picture.

With reference to the first aspect, in a first possible implementation manner, the determining a multi-frame algorithm according to the photographing environment includes, when the photographing environment is the scene with a wide depth of field, determining that the multi-frame algorithm is an extended depth of field (EDOF) algorithm.

With reference to the first aspect or the first possible implementation manner of the first aspect, in a second possible implementation manner, the determining a multi-frame algorithm according to the photographing environment further includes, when the photographing environment is the distant scene with an HDR, determining that the multi-frame algorithm is an HDR algorithm.

With reference to the first aspect or any one of the foregoing possible implementation manners of the first aspect, in a third possible implementation manner, the determining a multi-frame algorithm according to the photographing environment further includes, when the photographing environment is the distant scene with rich details, determining that the multi-frame algorithm is a super-resolution algorithm.

With reference to the first aspect, in a fourth possible implementation manner, the method further includes, when it is determined, by performing scene recognition on the first image and/or the second image, that the photographing environment is a night scene, determining that the multi-frame algorithm is a multi-frame noise reduction algorithm.

With reference to the first aspect or any one of the foregoing possible implementation manners of the first aspect, in a fifth possible implementation manner, the photographing method further includes, when the photographing environment is not any one of the night scene, the scene with a wide depth of field, the distant scene with an HDR, and the distant scene with rich details, and when the instruction for the photographing operation is received, generating a photograph according to the first image or the second image.

According to a second aspect, a dual-lens device is provided, where the dual-lens device includes a processor, a first lens and a second lens that are disposed on a same plane of the dual-lens device, a first image sensor corresponding to the first lens, and a second image sensor corresponding to the second lens, where the first image sensor is configured to collect a first image using the first lens; the second image sensor is configured to collect a second image using the second lens; and the processor is configured to acquire the first image collected at a first moment by the first image sensor and the second image collected at the first moment by the second image sensor, perform scene recognition on the first image and/or the second image, and perform depth estimation on the first image and the second image to determine a photographing environment, where the photographing environment includes at least one of a scene with a wide depth of field, a distant scene with an HDR, and a distant scene with rich details; determine a multi-frame algorithm according to the photographing environment; and when an instruction for a photographing operation is received, synthesize a third image and a fourth image using the multi-frame algorithm to generate a photograph.

With reference to the second aspect, in a first possible implementation manner, the processor is configured to, when the photographing environment is the scene with a wide depth of field, determine that the multi-frame algorithm is an EDOF algorithm.

With reference to the second aspect or the first possible implementation manner of the second aspect, in a second possible implementation manner, the processor is configured to, when the photographing environment is the distant scene with an HDR, determine that the multi-frame algorithm is an HDR algorithm.

With reference to the second aspect or any one of the foregoing possible implementation manners of the second aspect, in a third possible implementation manner, the processor is configured to, when the photographing environment is the distant scene with rich details, determine that the multi-frame algorithm is a super-resolution algorithm.

With reference to the second aspect, in a fourth possible implementation manner, the processor is further configured to, when it is determined, by performing scene recognition on the first image and/or the second image, that the photographing environment is a night scene, determine that the multi-frame algorithm is a multi-frame noise reduction algorithm.

With reference to the second aspect or any one of the foregoing possible implementation manners of the second aspect, in a fifth possible implementation manner, the processor is configured to, when the photographing environment is not any one of the night scene, the scene with a wide depth of field, the distant scene with an HDR, and the distant scene with rich details, and when the instruction for the photographing operation is received, generate a photograph according to the first image or the second image.

According to the embodiments of the present disclosure, when photographing is performed using a multi-frame algorithm, two frames of images can be collected at the same time using a dual-lens device, which can reduce impact on the images caused by a jitter of the device or a motion of a target object, so that ghost detection and an elimination algorithm are not required.

BRIEF DESCRIPTION OF DRAWINGS

To describe the technical solutions in the embodiments of the present disclosure more clearly, the following briefly introduces the accompanying drawings required for describing the embodiments or the prior art. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are some but not all of the embodiments of the present disclosure. All other embodiments obtained by a person of ordinary skill in the art based on the embodiments of the present disclosure without creative efforts shall fall within the protection scope of the present disclosure.

In the embodiments of the present disclosure, a dual-lens device may be installed on a mobile terminal such as a mobile phone, a tablet computer, or a handheld portable device, may be installed on a rear surface of a mobile device as a rear-facing dual-lens device, or may be installed on a front surface of a mobile device as a front-facing dual-lens device. Alternatively, one lens device may be installed on each of a front surface and a rear surface of a mobile device, and one of the lens devices may be rotated according to a user requirement, so that two lenses are disposed on a same plane. The present disclosure sets no limitation thereto.

It should be understood that, the term "and/or" in the embodiments of the present disclosure describes only an association relationship for describing associated objects and represents that three relationships may exist. For example, A and/or B may represent the following three cases: Only A exists, both A and B exist, and only B exists.

It should be noted that, in the following description, when two elements are "connected", the two elements may be directly connected, or may be indirectly connected using one or more intermediate elements. Connection manners of the two elements may include a contact manner or a non-contact manner. A person skilled in the art may make an equivalent replacement or modification to an exemplary connection manner in the following description, and the replacement or modification shall fall within the scope of the present disclosure.

Figure 1:
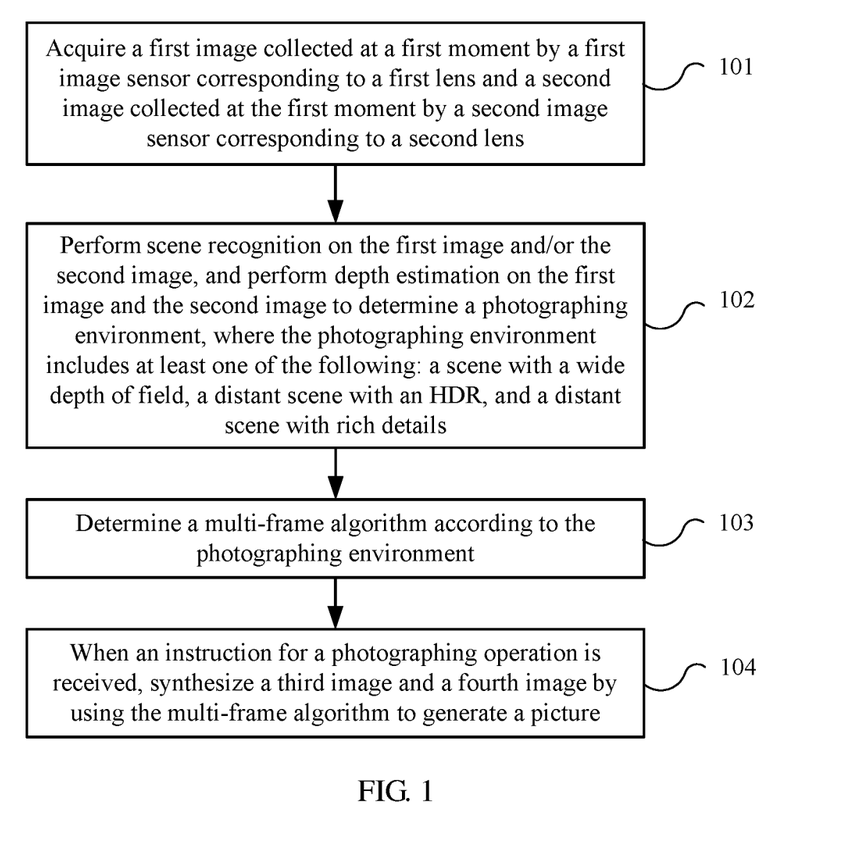
FIG. 1 is a flowchart of a photographing method for a dual-lens device according to an embodiment of the present disclosure.

FIG. 1 is a flowchart of a photographing method for a dual-lens device according to an embodiment of the present disclosure. The dual-lens device includes a first lens and a second lens that are disposed on a same plane of the dual-lens device, and the photographing method for the dual-lens device includes the following steps, 101. Acquire a first image collected at a first moment by a first image sensor corresponding to the first lens and a second image collected at the first moment by a second image sensor corresponding to the second lens.

102. Perform scene recognition on the first image and/or the second image, and perform depth estimation on the first image and the second image to determine a photographing environment, where the photographing environment includes at least one of the following: a scene with a wide depth of field, a distant scene with a HDR, and a distant scene with rich details.

103. Determine a multi-frame algorithm according to the photographing environment.

104. When an instruction for a photographing operation is received, synthesize a third image and a fourth image using the multi-frame algorithm to generate a picture.

According to this embodiment of the present disclosure, when photographing is performed using a multi-frame algorithm, two frames of images can be collected at the same time using a dual-lens device, which can reduce impact on the images caused by a jitter of the device or a motion of a target object, so that ghost detection and an elimination algorithm are not required.

In this embodiment of the present disclosure, the first image sensor is connected to the first lens, and the second image sensor is connected to the second lens. The connection may be an electrical connection, or may be a connection in another form.

In this embodiment of the present disclosure, the multi-frame algorithm may be at least one of an HDR algorithm, an EDOF algorithm, a super-resolution algorithm, or a multi-frame noise reduction algorithm.

In this embodiment of the present disclosure, the picture may be a photograph generated after a camera executes the photographing operation, or may be a frame of picture in a photographed image. The present disclosure sets no limitation thereto.

In this embodiment of the present disclosure, the dual-lens device may be a dual-lens camera installed on a mobile terminal such as a mobile phone or a handheld computer, may be another dual-lens video camera fixed on a device, or may be a dual-lens device in another form. The present disclosure sets no limitation thereto.

In this embodiment of the present disclosure, two lenses used by the dual-lens device are disposed on a same plane, for example, the two lenses may be both disposed on a rear surface of the device or may be both disposed on a front surface of the device. In this way, scenes or environments aimed by the two lenses are basically similar, and therefore, two frames of images collected at the same time by the two lenses are basically consistent.

In this embodiment of the present disclosure, the first lens and the second lens of the dual-lens device may use a same parameter, or may use different parameters. The present disclosure sets no limitation thereto. The parameter may include but is not limited to a focal length parameter, an aperture parameter, and an image stability parameter.

In step 101, the first image is a frame of image collected by the first image sensor, and the second image is another frame of image collected at the same moment by the second image sensor.

In step 102, scene recognition is performed on the first image and/or the second image, and a scene may be recognized as one of the following: a night scene, a wide scene, an HDR scene, and a scene with rich details.

Optionally, in an embodiment, when it is determined, according to the first image and/or the second image, that the photographing environment is the night scene in step 102, it may be determined that the multi-frame algorithm is the multi-frame noise reduction algorithm in step 103. Further, in step 104, when the instruction for the photographing operation is received, the third image and the fourth image are synthesized using the multi-frame noise reduction algorithm to generate the picture.

In this embodiment of the present disclosure, the third image is multiple frames of images collected, when the instruction for the photographing operation is received, by the first image sensor using the first lens, and the fourth image is corresponding to the third image and is multiple frames of images collected at the same time by the second image sensor using the second lens. That is, each frame of the third image and each frame of the fourth image are corresponding and are collected at the same time.

In step 104, if multiple frames of images are obtained by means of synthesis using the multi-frame noise reduction algorithm, for example, to obtain 100 frames of images by means of synthesis, 50 frames of images collected by the first image sensor and 50 frames of images collected at the same time by the second image sensor may be synthesized. The 50 frames of images collected by the first image sensor are the third image mentioned in step 104, and the 50 frames of images collected by the second image sensor are the fourth image mentioned in step 104.

In step 102, when a scene determined by means of scene recognition is one of the wide scene, the HDR scene, and the scene with rich details, depth estimation is performed on the first image and the second image, and it may be determined that the scene is a distant scene or a deep scene.

Relative to real three-dimensional coordinates, for coordinates of a pixel of an image collected using a single camera, a depth of the pixel is not unique, that is, a loss of depth information may be caused. In the present disclosure, depth information of a photographed object may be determined by means of depth estimation. Depth estimation may also be referred to as dual-camera depth estimation, and dual-camera depth estimation is a method in which two images of the measured object are acquired from two different positions using an imaging device, and based on a parallax principle, three-dimensional geometry information of the measured object is acquired by calculating a position deviation between corresponding pixels of the images. In this way, the position deviation between the pixels of the images is calculated by means of a trilateration principle using the two images of the same measured object that are collected at the same time, so that the depth information of the measured object in the three-dimensional world coordinates can be restored.

That is, when the photographing environment determined according to the first image and/or the second image is not the night scene, depth estimation may be first performed on the first image and the second image to acquire depth information of the photographing environment, and to further determine, according to the depth information, whether the photographing environment is the scene with a wide depth of field. If the photographing environment is not the scene with a wide depth of field, it may be further determined, according to the depth information, whether the photographing environment is a distant scene. By combining scene recognition and depth estimation, it may be determined that the photographing environment is one of the following: the scene with a wide depth of field, the distant scene with an HDR, and the distant scene with rich details.

Optionally, in another embodiment, in step 102, if it is determined, by means of scene recognition, that the scene is the wide scene, it may be further determined, by means of depth estimation, whether the wide scene is a deep scene, and if yes, the photographing environment is the scene with a wide depth of field; if it is determined, by means of scene recognition, that the scene is the HDR scene, it may be further determined, by means of depth estimation, whether the HDR scene is a distant scene, and if yes, the photographing environment is the distant scene with an HDR; and if it is determined, by means of scene recognition, that the scene is the scene with rich details, it may be further determined, by means of depth estimation, whether the scene with rich details is a distant scene, and if yes, the photographing environment is the distant scene with rich details.

Optionally, in another embodiment, in step 102, it may be first determined whether the photographing environment is the night scene; if the photographing environment is not the night scene, it is then determined whether the photographing environment is the scene with a wide depth of field; if the photographing environment is not the scene with a wide depth of field, it is further determined whether the photographing environment is the distant scene with an HDR; and if the photographing environment is not the distant scene with an HDR, it is still further determined whether the photographing environment is the distant scene with rich details.

That is, when the photographing environment is determined, scene recognition may be first performed, and depth estimation is then performed, or scene recognition and depth estimation may be combined for determining at the same time. The present disclosure sets no limitation thereto.

Optionally, in an embodiment, in step 103, when the photographing environment determined in step 102 is the scene with a wide depth of field, it may be determined that the multi-frame algorithm is the EDOF algorithm. Optionally, in another embodiment, after step 104, for the picture generated in step 104, a focus position may be reselected according to an instruction of a user, so as to perform a refocus operation.

Optionally, in another embodiment, in step 103, when the photographing environment determined in step 102 is the distant scene with an HDR, it may be determined that the multi-frame algorithm is the HDR algorithm.

Optionally, in another embodiment, in step 103, when the photographing environment determined in step 102 is the distant scene with rich details, it may be determined that the multi-frame algorithm is the super-resolution algorithm.

Optionally, in another embodiment, in step 103 and step 104, when the photographing environment determined in step 102 is not any one of the following photographing environments: the night scene, the scene with a wide depth of field, the distant scene with an HDR, and the distant scene with rich details, and when the instruction for the photographing operation is received, a picture may be generated according to the first image or the second image. When the instruction for the photographing operation is received, the picture may be generated using the first image, or the picture may be generated using the second image. The photographing operation may be similar to a photographing operation of a single-lens camera.

A photographing environment of the dual-lens device and a corresponding multi-frame algorithm are shown in Table 1.

TABLE 1

| Photographing environment | Multi-frame algorithm |
|---|---|
| Night scene | Multi-frame noise reduction algorithm |
| Scene with a wide depth of field | EDOF algorithm |
| Distant scene with an HDR | HDR algorithm |
| Distant scene with rich details | Super-resolution algorithm |

As shown in Table 1, when the multi-frame algorithm corresponding to the photographing environment is used for photographing, picture quality can be improved.

Optionally, in an embodiment, in step 104, when the instruction for the photographing operation is received, synthesis processing may be performed on the third image and the fourth image according to the multi-frame algorithm determined in step 103, to further generate the picture.

Multiple frames of images collected by the first image sensor may be acquired, and may be referred to as the third image; and multiple frames of images collected at the same time by the second image sensor may be acquired, and may be referred to as the fourth image. Synthesis processing is performed on the third image and the fourth image using the multi-frame algorithm determined in step 103, to generate the picture. For example, to obtain 100 frames of images by means of synthesis using the multi-frame algorithm, 50 frames of images collected by the first image sensor and 50 frames of images collected at the same time by the second image sensor may be synthesized. The 50 frames of images collected by the first image sensor are the third image mentioned in step 104, and the 50 frames of images collected by the second image sensor are the fourth image mentioned in step 104. In addition, a noise reduction effect of a picture generated by synthesizing multiple images using the multi-frame noise reduction algorithm is better than that of a single image; a luminance dynamic range of a picture generated by synthesizing multiple images using the HDR algorithm is larger than that of a single image; and a resolution of a picture generated by synthesizing multiple images using the super-resolution algorithm is higher than that of a single image.

It should be noted that the photographing operation in step 104 may be a photographing operation executed by a user, for example, pressing a specific button; may be a photographing operation preconfigured by the dual-lens device, for example, each photographing operation for which automatic photographing is set; or may be a photographing operation in another form. The present disclosure sets no limitation thereto.

In this embodiment of the present disclosure, two lens of a dual-lens device each can collect a frame of image at the same time, and in this way, when photographing is performed using a multi-frame algorithm, a photographing time can be reduced. Moreover, because the photographing time is reduced, impact caused by a jitter of the device or a motion of a target object can be reduced. In this way, when a synthesis algorithm is performed on multiple frames of images, ghost detection and an elimination algorithm may not be required, which may further reduce the photographing time. In addition, because different multi-frame algorithms are applicable to different photographing environments, in this embodiment of the present disclosure, before a photographing operation is performed using a multi-frame algorithm, a photographing environment needs to be first determined, and a required multi-frame algorithm is determined according to the photographing environment.

Figure 2:
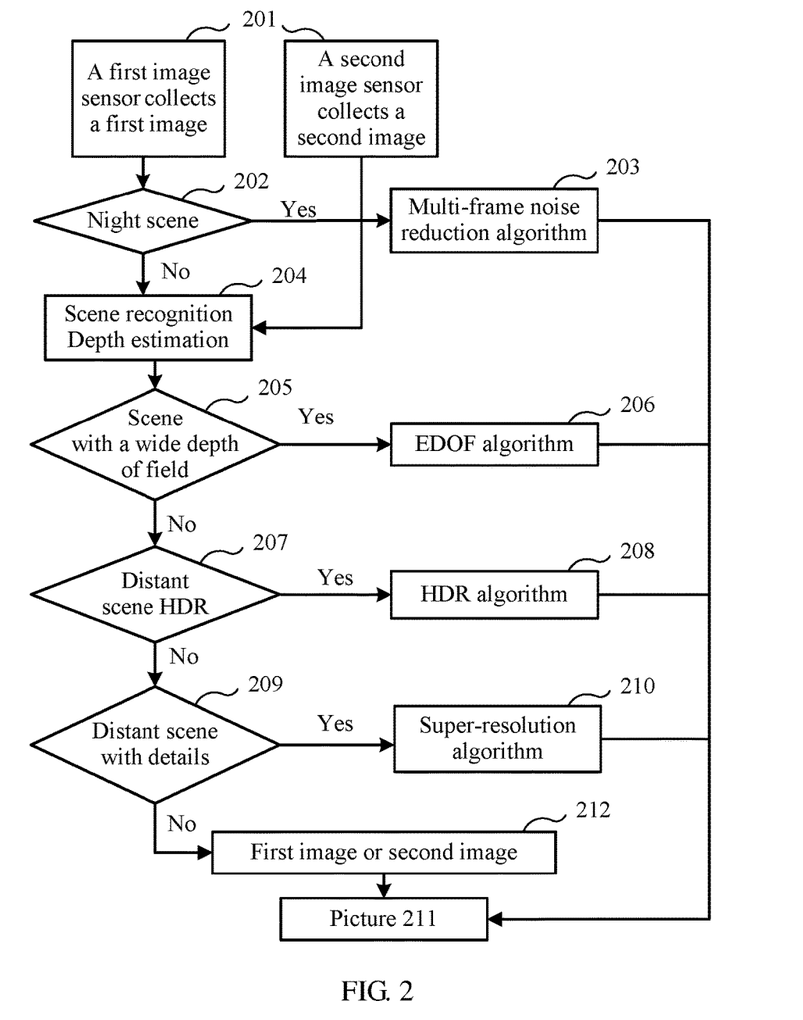
FIG. 2 is a flowchart of a photographing method for a dual-lens device according to another embodiment of the present disclosure.

FIG. 2 is a flowchart of a photographing method for a dual-lens device according to another embodiment of the present disclosure. The dual-lens device includes a first lens and a second lens that are disposed on a same plane of the dual-lens device, and the method includes the following steps.

201. Acquire a first image collected at a first moment by a first image sensor corresponding to the first lens and a second image collected at the first moment by a second image sensor corresponding to the second lens.

202. Perform scene recognition according to the first image; if it is determined that a photographing environment is a night scene, execute step 203; otherwise, execute step 204.

Optionally, in another embodiment, in step 202, scene recognition may be performed according to the second image to determine that the photographing environment is the night scene; or scene recognition may be performed according to the first image and the second image to determine that the photographing environment is the night scene.

203. When an instruction for a photographing operation is received, synthesize a third image and a fourth image using a multi-frame noise reduction algorithm to generate a picture 211.

204. Perform scene recognition on the first image and/or the second image, and perform depth estimation on the first image and/or the second image to determine the photographing environment, where the photographing environment includes at least one of the following: a scene with a wide depth of field, a distant scene with an HDR, and a distant scene with rich details.

In step 204, scene recognition may be performed on the first image and/or the second image, and it may be recognized whether a scene is a wide scene, it may be recognized whether the scene is an HDR scene, or it may be recognized whether the scene is a scene with rich details. Depth estimation is performed on the first image and the second image, and it may be estimated whether the scene is a distant scene, or it may be estimated whether the scene is a deep scene. Further, the photographing environment may be determined by combining scene recognition and depth estimation.

205. When the photographing environment is the scene with a wide depth of field, determine that a multi-frame algorithm is an EDOF algorithm and execute step 206; otherwise, execute step 207.

In step 204, if the scene determined by performing scene recognition on the first image and/or the second image is the wide scene, depth estimation is then performed on the first image and the second image to acquire depth information, so as to further determine, according to the depth information, whether the wide scene is a deep scene. In this way, it may be determined whether the photographing environment is the scene with a wide depth of field.

206. When an instruction for a photographing operation is received, synthesize a third image and a fourth image using the EDOF algorithm to generate a picture 211.

207. When the photographing environment is not the scene with a wide depth of field and the photographing environment is the distant scene with an HDR, determine that the multi-frame algorithm is an HDR algorithm and execute step 208; otherwise, execute step 209.

In step 204, if the scene determined by performing scene recognition on the first image and/or the second image is the HDR scene, depth estimation is then performed on the first image and the second image to acquire depth information, so as to further determine, according to the depth information, whether the scene is a distant scene. In this way, it may be determined whether the photographing environment is the distant scene with an HDR.

208. When an instruction for a photographing operation is received, synthesize a third image and a fourth image using the HDR algorithm to generate a picture 211.

209. When the photographing environment is not the HDR scene and the photographing environment is the distant scene with rich details, determine that the multi-frame algorithm is a super-resolution algorithm and execute step 210; otherwise, execute step 212.

In step 204, if the scene determined by performing scene recognition on the first image and/or the second image is the scene with rich details, depth estimation is further performed on the first image and the second image to acquire depth information, so as to further determine, according to the depth information, whether the scene is a distant scene. In this way, it may be determined whether the photographing environment is the distant scene with rich details.

210. When an instruction for a photographing operation is received, synthesize a third image and a fourth image using the super-resolution algorithm to generate a picture 211.

211. The generated picture.

212. When an instruction for a photographing operation is received, generate a picture 211 according to the first image or the second image.

In step 212, it may also be understood that, when the photographing environment is not any one of the night scene, the scene with a wide depth of field, the distant scene with an HDR, and the distant scene with rich details, the foregoing multi-frame algorithm is not used, and when the instruction for the photographing operation is received, the picture 211 is directly generated according to the first image or the second image. It may also be understood that photographing is performed using a photographing method similar to that of a single-lens device.

According to this embodiment of the present disclosure, when photographing is performed using a multi-frame algorithm, two frames of images can be collected at the same time using a dual-lens device, which can reduce impact on the images caused by a jitter of the device or a motion of a target object, so that ghost detection and an elimination algorithm are not required, thereby reducing a photographing time.

It should be noted that FIG. 2 shows only one embodiment of the present disclosure. A person skilled in the art should be able to understand that a photographing environment determining sequence shown in FIG. 2 is not unique, and even if the photographing environment determining sequence changes, the change shall still fall within the scope of this embodiment of the present disclosure.

Figure 3:
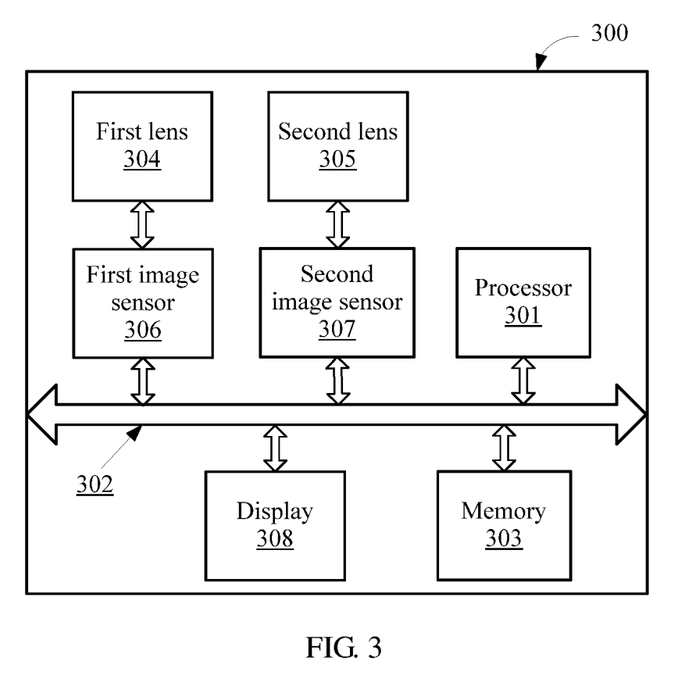
FIG. 3 is a structural diagram of a dual-lens device according to an embodiment of the present disclosure.

FIG. 3 is a structural diagram of a dual-lens device according to an embodiment of the present disclosure. A dual-lens device 300 shown in FIG. 3 includes a processor 301, a memory 303, a first lens 304 and a second lens 305 that are disposed on a same plane of the dual-lens device 300, a first image sensor 306 corresponding to the first lens 304, and a second image sensor 307 corresponding to the second lens 305.

The first image sensor 306 is configured to collect a first image using the first lens 304.

The second image sensor 307 is configured to collect a second image using the second lens 305.

The processor 301 is configured to acquire the first image collected at a first moment by the first image sensor 306 and the second image collected at the first moment by the second image sensor 307; perform scene recognition on the first image and/or the second image, and perform depth estimation on the first image and the second image to determine a photographing environment, where the photographing environment includes at least one of the following: a scene with a wide depth of field, a distant scene with an HDR, and a distant scene with rich details; determine a multi-frame algorithm according to the photographing environment; and when an instruction for a photographing operation is received, synthesize a third image and a fourth image using the multi-frame algorithm to generate a picture.

According to this embodiment of the present disclosure, when photographing is performed using a multi-frame algorithm, two frames of images can be collected at the same time using a dual-lens device, which can reduce impact on the images caused by a jitter of the device or a motion of a target object, so that ghost detection and an elimination algorithm are not required, thereby reducing a photographing time.

In this embodiment of the present disclosure, the dual-lens device 300 may further include a display 308, and the display 308 may be configured to display a preview image, where the preview image may be the first image or the second image, or the preview image may be another image collected by the first image sensor at another moment or another image collected by the second image sensor at another moment. The display 308 may also be configured to display the generated picture.

Components of the dual-lens device 300 are coupled together using a bus system 302, where in addition to a data bus, the bus system 302 further includes a power bus, a control bus, and a status signal bus. However, for clear description, various types of bus shown in FIG. 3 are marked as the bus system 302.

Optionally, in an embodiment, the processor 301 may be configured to, when the photographing environment is the scene with a wide depth of field, determine that the multi-frame algorithm is an EDOF algorithm.

Optionally, in another embodiment, the processor 301 may further be configured to, when the photographing environment is the distant scene with an HDR, determine that the multi-frame algorithm is an HDR algorithm.

Optionally, in another embodiment, the processor 301 may further be configured to, when the photographing environment is the distant scene with rich details, determine that the multi-frame algorithm is a super-resolution algorithm.

Optionally, in another embodiment, the photographing environment may further include a night scene, and the processor 301 may further be configured to, when it is determined, according to the first image and/or the second image, that the photographing environment is the night scene, determine that the multi-frame algorithm is a multi-frame noise reduction algorithm.

Optionally, in another embodiment, the processor 301 may further be configured to, when the photographing environment is not any one of the night scene, the scene with a wide depth of field, the distant scene with an HDR, and the distant scene with rich details, and when the instruction for the photographing operation is received, generate a picture according to the first image or the second image.

In this embodiment of the present disclosure, the processor 301 may be an image signal processor (ISP) in the dual-lens device, may be a central processing unit (CPU) in the dual-lens device, or may be an ISP and a CPU in the dual-lens device. The present disclosure sets no limitation thereto.

The method disclosed in the foregoing embodiments of the present disclosure may be applied to the processor 301, or implemented by the processor 301. The processor 301 may be an integrated circuit chip and has a signal processing capability. In an implementation process, the steps in the foregoing method may be completed by means of an integrated logic circuit of hardware in the processor 301 or an instruction in a form of software. The foregoing processor 301 may be a general purpose processor, a digital signal processor (DSP), an application-specific integrated circuit (ASIC), a field programmable gate array (FPGA), or another programmable logical device, discrete gate or transistor logical device, or discrete hardware component. Methods, steps and logical block diagrams disclosed in the embodiments of the present disclosure may be implemented or executed. A general purpose processor may be a microprocessor or the processor may be any conventional processor or the like. Steps of the method disclosed with reference to the embodiments of the present disclosure may be directly executed and accomplished by means of a hardware decoding processor, or may be executed and accomplished using a combination of hardware and software modules in a decoding processor. The software module may be located in a mature storage medium in the field, such as a random access memory (RAM), a flash memory, a read-only memory (ROM), a programmable read-only memory, an electric ally-eras able programmable memory, or a register. The storage medium is located in the memory 303, and the processor 301 reads information in the memory 303 and completes the steps in the foregoing method in combination with hardware of the processor 301.

It should be noted that although the display 308 is described as a part of the dual-lens device 300 shown in FIG. 3, this embodiment of the present disclosure sets no limitation on a position of the display 308. For example, the display 308 may be an external display, and is connected to the dual-lens device 300 using an image interface, so as to display an image acquired by the dual-lens device 300. In addition, the display 308 may present an image using various technologies such as a liquid crystal array, a plasma unit, and a cathode-ray tube, and this embodiment of the present disclosure sets no limitation on an implementation manner of the display 308.

It should be noted that the display 308 may be a touchscreen, where the touchscreen may receive an input operation of a user. The instruction for the photographing operation that is received by the processor 301 may be transmitted by another hardware of the dual-lens device 300, or may be preset by internal software of the processor 301. The present disclosure sets no limitation thereto. The another hardware of the foregoing dual-lens device 300 may be a specific button, or may be the foregoing display 308 with a touch function. For example, the photographing operation may be that the user presses a specific button, or the user taps a specific position on the display 308. The photographing operation executed by the user may be conveyed to the processor 301 using a pressure sensor, so that the processor 301 receives the instruction for the photographing operation.

The dual-lens device 300 can implement each process in the embodiment shown in FIG. 1 or FIG. 2. To avoid repetition, details are not described herein again.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that such implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on multiple network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of the present disclosure essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of the present disclosure. The foregoing storage medium includes any medium that can store program code, such as a universal serial bus (USB) flash drive, a removable hard disk, a ROM, a RAM, a magnetic disk, or an optical disc.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A photographing method for a dual-lens device, wherein the dual-lens device comprises a first lens and a second lens that are disposed on a same plane of the dual-lens device, the photographing method comprising:
   acquiring a first image collected at a first moment by a first image sensor corresponding to the first lens and a second image collected at the first moment by a second image sensor corresponding to the second lens;
   determining whether a photographing environment is a night scene by performing scene recognition on at least one of the first image and the second image;
   when the photographing environment is the night scene, determining that a multi-frame algorithm is a multi-frame noise reduction algorithm;
   when the photographing environment is not the night scene:
      performing depth estimation on the first image and the second image;
      determining, based on the depth estimation performed on the first image and the second image, that the photographing environment comprises at least one of a first scene having a depth of field characteristic, a second scene having a dynamic range characteristic and a distance characteristic, and a third scene having a level of details characteristic and the distance characteristic; and
      determining the multi-frame algorithm according to whether the photographing environment corresponds to the first scene, the second scene, or the third scene;
   subsequent to determining the photographing environment, receiving an instruction for a photographing operation; and
   synthesizing a third image and a fourth image using the multi-frame algorithm to generate a picture when the instruction for the photographing operation is received.

2. The photographing method according to claim 1, wherein determining the multi-frame algorithm according to the photographing environment comprises determining that the multi-frame algorithm is an extended depth of field (EDOF) algorithm when the photographing environment is the first scene.

3. The photographing method according to claim 1, wherein determining the multi-frame algorithm according to the photographing environment further comprises determining that the multi-frame algorithm is a high dynamic range (HDR) algorithm when the photographing environment is the second scene.

4. The photographing method according to claim 1, wherein determining the multi-frame algorithm according to the photographing environment further comprises determining that the multi-frame algorithm is a super-resolution algorithm when the photographing environment is the third scene.

5. The photographing method according to claim 1, further comprising determining, based on the scene recognition, that the photographing environment is a fourth scene having a width characteristic, a fifth scene having the dynamic range characteristic, or a sixth scene having the level of details characteristic, wherein the depth estimation is performed when the photographing environment is not the night scene and the photographing environment corresponds to the fourth scene, the fifth scene, or the sixth scene.

6. The photographing method according to claim 1, further comprising generating a picture according to the first image or the second image when the photographing environment is not any one of the night scene, the first scene, the second scene, and the third scene, and when the instruction for the photographing operation is received.

7. A dual-lens device, comprising:
   a first lens and a second lens that are disposed on a same plane of the dual-lens device;
   a first image sensor corresponding to the first lens, wherein the first image sensor is configured to collect a first image at a first moment using the first lens;
   a second image sensor corresponding to the second lens, wherein the second image sensor is configured to collect a second image at the first moment using the second lens; and
   a processor coupled to the first and second image sensors and configured to:
      acquire the first image collected at the first moment by the first image sensor and the second image collected at the first moment by the second image sensor;
      determine whether a photographing environment is a night scene by performing scene recognition on at least one of the first image and the second image;
      when the photographing environment is the night scene, determine that a multi-frame algorithm is a multi-frame noise reduction algorithm;
      when the photographing environment is not the night scene:
         perform depth estimation on the first image and the second image;
         determine, based on the depth estimation performed on the first image and the second image, that the photographing environment comprises at least one of a first scene having a depth of field characteristic, a second scene having a dynamic range characteristic and a distance characteristic, and a third scene having a level of details characteristic and the distance characteristic; and determine the multi-frame algorithm according to whether the photographing environment corresponds to the first scene, the second scene, or the third scene;

subsequent to determining the photographing environment, receiving an instruction for a photographing operation; and synthesize a third image and a fourth image using the multi-frame algorithm to generate a picture when the instruction for the photographing operation is received.

8. The dual-lens device according to claim 7, wherein the processor is further configured to determine that the multi-frame algorithm is an extended depth of field (EDOF) algorithm when the photographing environment is the first scene.

9. The dual-lens device according to claim 7, wherein the processor is further configured to determine that the multi-frame algorithm is a high dynamic range (HDR) algorithm when the photographing environment is the second scene.

10. The dual-lens device according to claim 7, wherein the processor is further configured to determine that the multi-frame algorithm is a super-resolution algorithm when the photographing environment is the third scene.

11. The dual-lens device according to claim 7, wherein the processor is further configured to determine, based on the scene recognition, that the photographing environment is a fourth scene having a width characteristic, a fifth scene having the dynamic range characteristic, or a sixth scene having the level of details characteristic, wherein the depth estimation is performed when the photographing environment is not the night scene and the photographing environment corresponds to the fourth scene, the fifth scene, or the sixth scene.

12. The dual-lens device according to claim 7, wherein the processor is further configured to generate a picture according to the first image or the second image when the photographing environment is not any one of the night scene, the first scene, the second scene, and the third scene, and when the instruction for the photographing operation is received.

13. A photographing method for a dual-lens device, wherein the dual-lens device comprises a first lens and a second lens, the method comprising:

acquiring a first image collected by a first image sensor corresponding to the first lens and a second image collected by a second image sensor corresponding to the second lens;

determining whether a photographing environment is a night scene by performing scene recognition on at least one of the first image and the second image;

when the photographing environment is the night scene, determining that a multi-frame algorithm is a multi-frame noise reduction algorithm;

when the photographing environment is not the night scene:

performing depth estimation on the first image and the second image;

determining, based on the depth estimation performed on the first image and the second image, that the photographing environment comprises at least one of a first scene having a depth of field characteristic, a second scene having a dynamic range characteristic and a distance characteristic, and a third scene having a level of details characteristic and the distance characteristic; and determining the multi-frame algorithm according to whether the photographing environment corresponds to the first scene, the second scene, or the third scene; and synthesizing a third image and a fourth image by using the multi-frame algorithm to generate a picture.

14. The photographing method according to claim 13, wherein determining the multi-frame algorithm according to the photographing environment comprises determining that the multi-frame algorithm is an extended depth of field (EDOF) algorithm when the photographing environment is the first scene.

15. The photographing method according to claim 13, wherein determining the multi-frame algorithm according to the photographing environment further comprises determining that the multi-frame algorithm is a high dynamic range (HDR) algorithm when the photographing environment is the second scene.

16. The photographing method according to claim 13, wherein determining the multi-frame algorithm according to the photographing environment further comprises determining that the multi-frame algorithm is a super-resolution algorithm when the photographing environment is the third scene.

17. The photographing method according to claim 13, further comprising determining, by performing the scene recognition, that the photographing environment is a fourth scene having a width characteristic, a fifth scene having the dynamic range characteristic, or a sixth scene having the level of details characteristic, wherein the depth estimation is performed when the photographing environment is not the night scene and the photographing environment corresponds to the fourth scene, the fifth scene, or the sixth scene.

18. The photographing method according to claim 13, further comprising generating a picture according to the first image or the second image when the photographing environment is not any one of the night scene, the first scene, the second scene, and the third scene.

19. The photographing method according to claim 13, wherein the first and second images are collected by the first and second image sensors at a same time.

20. The photographing method according to claim 13, wherein the first lens is on a same plane as the second lens.

* * * * *

UNITED STATES PATENT AND TRADEMARK OFFICE
CERTIFICATE OF CORRECTION

PATENT NO. : 9,973,672 B2
APPLICATION NO. : 15/102203
DATED : May 15, 2018
INVENTOR(S) : Du et al.

Page 1 of 1

It is certified that error appears in the above-identified patent and that said Letters Patent is hereby corrected as shown below:

On the Title Page

Item [*], should read:
Subject to any disclaimer, the term of this patent is extended or adjusted under 35 U.S.C. 154(b) by 0 days.

Signed and Sealed this
Tenth Day of July, 2018

Andrei Iancu
*Director of the United States Patent and Trademark Office*